United States Patent Office 3,790,568
Patented Feb. 5, 1974

---

3,790,568
PROCESS FOR PREPARING THIOAMINES
Joseph Edward Kerwood and Robert I. Leib, Akron, Ohio, assignors to Monsanto Company, St. Louis, Mo.
No Drawing. Filed Mar. 9, 1970, Ser. No. 17,944
Int. Cl. C07c 145/00; C07d 51/70, 87/28
U.S. Cl. 260—247.1                    16 Claims

ABSTRACT OF THE DISCLOSURE

A process for preparing thioamines which comprises reacting a secondary amine or tertiary alkyl primary amine with a thioamide.

---

This invention relates to the manufacture of thioamines. More particularly, it concerns the preparation of thioamines by reacting an amine with a thioamide.

It has been known for a long time that thioamines accelerate the vulcanization of rubber and more recently that some of them inhibit prevulcanization of rubber. Thioamines also comprise intermediates, insecticides, anthelmintics, herbicides, fungicides, nematocides, bactericides and surface-active agents used in floatation or settling processes.

Currently, thioamines are produced by reacting an organic sulfenyl chloride with an amine in the presence of an acid acceptor. As acid acceptor, excess amine may be used but it is expensive either to discard the excess or recover it. Moreover, side reactions occur in the reaction of organic sulfenyl chloride with amines which reduce the yield and lead to impurities difficult to remove.

A new reaction has been discovered that yields high quality thioamines often in substantially quantitative yields. The reacation proceeds under mild conditions and does not require an excess of one of the reactants. The reaction is a general one by which it is possible to produce thioamine heretofore attainable only with difficulty. These and other advantages will become apparent as the description of the invention proceeds.

SUMMARY OF THE INVENTION

According to the present invention a thioamine R—S—R' is produced by reacting a secondary amine or a tertiary alkyl primary amine with an N-thioamide containing the desired R substituent where R is alkyl, aryl, aralkyl, alkaryl, or cycloalkyl and R' is the residue of the amine from removal of hydrogen on the nitrogen atom, R' being attached to sulfur at a nitrogen atom. Amines useful in the process may be represented by the formula

where $a$ and $b$ independently are alkyl, aralkyl or cycloalkyl; or $a$ may be hydrogen when $b$ is tertiary alkyl; or $a$ and $b$ are alkylene which with the nitrogen atom form a heterocycle which alkylene may contain radicals selected from the group consisting of —O—, —S—, or —NH—. The N-thioamide may be represented by the formula

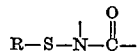

where the dangling valence on the nitrogen may be linked to a second carbonyl, alkyl, alkaryl, aryl, aralkyl, cycloalkyl, hydrogen, alkylene carbon, or arylene carbon and R is alkyl, alkaryl, aryl, aralkyl or cycloalkyl and the dangling valence on the carbonyl may be linked to alkyl, aralkyl, aryl, alkaryl, cycloalkyl, alkylene carbon or arylene carbon, or in general, the unsatisfied dangling valences of the nitrogen and carbonyl radicals may be satisfied by forming a heterocyclic ring through common alkylene, alkenylene, aralkenylene, cycloalkylene, cycloalkenylene, alkarylene or arylene radicals. N-thioamides suitabe for use in the process have been described in the literature. In general, the N-thioamides disclosed as prevulcanization inhibitors in patent applications and patents of Coran and Kerwood Ser. No. 714,445, filed Mar. 20, 1968, now U.S. Pat. 3,546,185 issued Dec. 8, 1970, Ser. No. 704,186 filed Sept. 20, 1967, now abandoned in favor of Ser. No. 113,633, filed Feb. 8, 1971; U.S. Pat. 3,473,667, issued Oct. 21, 1969 and U.S. Pat. 3,427,319, issued Feb. 11, 1969 are suitable reactants for the practice of this invention and are hereby incorporated by reference.

All cyclic and acylic secondary amines appear to be suitable for the process but dialkyl amines containing one to ten carbon atoms in each alkyl group and strong heterocyclic amines are preferred. When heterocyclic amines containing two —NH— groups are used, bisthioamines may be produced.

Of the amide reactants, imides are particularly convenient and effective. A preferred imide reactant suitable for the practice of the invention and the reaction therewith are represented by Equation I:

(I)

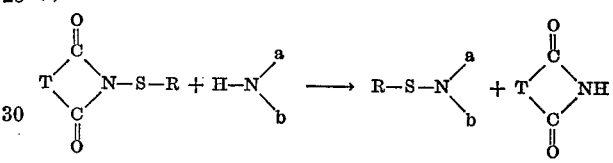

where R is the same as previously described and T represents (acyclic or cyclic) aliphatic, olefinic or aromatic divalent radicals. Examples of T are alkylene, alkenylene and arylene, such as phenylene. The R radical may contain substituents. Suitable substituents are chloro, bromo, fluoro, iodo, hydroxy, alkoxy or nitro.

When a heterocyclic amine contains two —NH— groups the equation is:

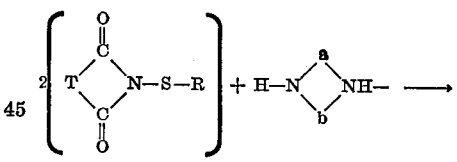

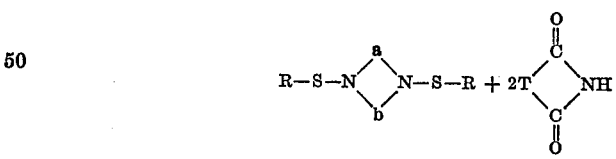

where $a$ and $b$ are alkylene or together are alkylene dialkylene as in the 4,4'-alkylene dipiperidines.

Different thioamines may be produced by varying R, $a$, and $b$ of the reactants. The reaction produces by-product imide which must be separated from the thioamine product. For this reason, it is convenient to conduct the reaction in an inert solvent in which the by-product is insoluble. Separation is then easily accomplished by filtration. By selecting a reactant which produces an insoluble imide, isolation of the thioamine is facilitated. The thioamine is recovered, for example, by evaporating the solvent and may be purified by distillation if desired.

The term "alkyl" means any monovalent radical derived from an aliphatic saturated hydrocarbon by the removal of one hydrogen atom. The general formula is $C_nH_{2n+1}$. The alkyl radical may be primary, secondary, or tertiary, and any carbon chain attached to the carbon from which the hydrogen is removed may be branched or unbranched. Alkyl radicals of 1–20 carbon atoms are suitable. Lower alkyl radicals of 1–10 carbon atoms are preferred. Cycloalkyl radicals are aliphatic cyclic hydrocarbons of the series $C_nH_{2n-1}$. The preferred cycloalkyl radicals contain 5–8 carbon atoms in the ring but cycloalkyl radicals of 3–12 carbon atoms are suitable. Aralkyl radicals are univalent alkyl radicals having an aryl radical attached to the aliphatic hydrocarbon chain. Preferred aralkyl radicals are benzyl, 1-phenethyl, 2-phenethyl, 2-phenylpropyl and 2-phenyl-2-propyl.

Aryl is a monovalent organic radical, the free valence of which belongs to an aromatic carbocyclic nucleus and not to a side chain. Phenyl, naphthyl and anthracenyl are examples. Alkaryl radicals are aryl radicals as described having lower alkyl radicals attached to the carbocyclic chain, examples of which are tolyl, xylyl, cumenyl and p-t-butylphenyl.

The term alkylene means any divalent radical derived from an aliphatic saturated hydrocarbon by the removal of two hydrogen atoms which radical has the general formula $C_nH_{2n}$. Lower alkylene radicals of 2–6 carbon atoms are preferred. Cycloalkylene is a divalent radical derived by removal of two hydrogen atoms from different carbon atoms of an aliphatic cyclic hydrocarbon. The genreal formula for cycloalkylenes is $C_nH_{2n-2}$. Cycloalkylenes of 5–8 carbon atoms are preferred.

Alkenylene means a divalent radical derived from an aliphatic unsaturated hydrocarbon by the removal of two hydrogen atoms from different carbons atoms. Alkenylene belongs to the series $C_nH_{2n-2}$ and contains one double bond. Lower alkenylene radicals of 2 to 10 carbon atoms are preferred. Cycloalkenylene means a divalent radical derived from introducing a double bond into a cycloalkylene radical. The general formula for cycloalkenylenes is $C_nH_{2n-4}$ and contains one double bond. Lower cycloalkenylenes of 5 to 8 carbon atoms are preferred.

Specific examples of R are methyl, ethyl, propyl, isopropyl, butyl, isobutyl, sec.-butyl, tert.-butyl, amyl, hexyl, octyl, decyl, dodecyl, hexadecyl, eicosyl, cyclopentyl, cyclohexyl, cyclooctyl, cycldodecyl, benzyl, cumenyl, phenethyl, phenyl, naphthyl, anthracenyl, tolyl, xylenyl, diethylphenyl, and ethyltolyl.

Examples of R when the radicals have substituents are 4-chlorophenyl, 2-bromophenyl, p-bromobenzyl, 4-fluorocyclohexyl, 3-chlorocyclohexyl and 4-nitrophenyl.

Examples of T are alkylene, aralkylene, cycloalkylene, alkenylene, cycloalkenylene, arylene and alkarylene and more particularly, ethylene, propylene, butylene, amylene, hexylene, octylene, cyclobutylene, cyclopentylene, cyclooctylene, vinylene, propenylene, phenylene and naphthylene. The heterocyclic radical made by T along with the two carbonyl groups and the nitrogen atom is an imido radical, examples of which are succinimidyl, glutarimidyl, adipimidyl, phthalimidyl, maleimidyl, and hydrophthalimidyl.

Illustrative thioamines which may be prepared by the process are: Any of the N-alkylthio-dialkyl amines (N,N-dialkyl-alkylsulfenamides) such as N-butylthio dimethylamine and N-hexylthio ethylpropylamine; any of the N-cycloalkylthio-dialkylamines such as N-cyclohexylthio-diethylamine; any of the N-arylthio dialkylamines such as N-phenylthio-methylethylamine; any of the N-alkarylthio-dialkylamines such as N-tolylthiodibutylamine; any of the N-aralkylthio-dialkylamines such as N-benzylthio dihexylamine; any of the N-alkylthio-, N-cycloalkylthio-, or N-arylthio-N-alkyl cycloalkylamines such as N-propylthio-N-methyl cyclohexylamine, N-cyclooctylthio-N-methyl cyclohexylamine and N-phenylthio-N-ethyl cyclopentylamine.

Any of the N-alkylthio-, N-cycloalkylthio-, or N-arylthio dicyclohexylamines such as N-methylthio dicyclohexylamine, N-propylthio dicyclopentylamine and N-phenylthio dicyclohexylamine.

Any of the bis alkylthio-, bis arylthio-, bis cycloalkylthio-, or bis aralkylthio heterocyclic amines such as N,N'-di(propylthio)piperazine,
N,N'di(cyclohexylthio)piperazine,
N,N'-di(phenylthio)piperazine,
N,N'-di(cyclohexylthio)4,4'-dimethyl dipiperidine and
N,N'-di(phenylthio)4,4'-methylene dipiperidine.

N-phenylthio tert-butylamine and N-cyclohexylthio tert-octyl amine are also examples of compounds which may be prepared.

Still other thioamines which may be prepared by the process are the benzylthioamines such as N-methylthio dibenzylamine,
N-ethylthio dibenzylamine,
N-propylthio dibenzylamine,
N-hexylthio dibenzylamine,
N-cyclohexylthio dibenzylamine,
N-cyclopentylthio dibenzylamine,
N-phenylthio dibenzylamine,
N-benzylthio dibenzylamine,
N-ethylthio-N-ethyl benzylamine,
N-methylthio-N-ethyl benzylamine,
N-propylthio-N-isopropyl benzylamine,
N-butylthio-N-butyl benzylamine,
N-phenylthio-N-methyl benzylamine and N-cyclohexylthio-N-ethyl benzylamine.

Examples of alkylene amines which may be prepared are

N-methylthio pyrrolidine,
N-ethylthio piperidine,
N-propylthio-2,5-dimethylpyrrolidine,
N-isopropylthio-2,6-dimethyl piperidine,
N-butylthio-2,4,6-trimethyl piperidine,
N-cyclopentylthio hexamethylenimine,
N-pentylthio hexamethylenimine,
N-benzylthio hexamethylenimine,
N-cyclohexylthioheptamethylenimine,
N-cyclooctylthio octamethylenimine,
N-propylthio heptamethylenimine,
N-ethylthio octamethylenimine and N-phenylthioheptamethylenimine.

An advantage of this process is that the recovered imide may be converted to a thioimide and reused. Solvents suitable for the process are carbon tetrachloride, ether, xylene, alcohol, heptane, benzene and toluene.

The process can be performed at moderate temperatures. Generally, the reaction is conducted between 0–100° C. Room temperature is convenient in many cases. The optimum temperature is determined by a number of factors such as reaction rate, boiling point of the solvent or reactants, solubility of reactants or products, or stability of the products. Higher temperatures may be used when the products are sufficiently stable.

The following specific embodiments are illustrative of the process but are not meant to be limitative.

DESCRIPTION OF PREFERRED EMBODIMENTS

Example 1

Tert-butylamine (39.0 g., 0.53 mole) is added in one portion to N-cyclohexylthio phthalimide (130.0 g., 0.5 mole) in 700 ml. of benzene at room temperature. The mixture is stirred overnight and then filtered to remove 32.0 g. of phthalimide. An additional ten grams of tert-butylamine is added and the mixture heated with stirring to 40° C. The reaction mixture is then distilled and the fraction boiling at 67–69° C. at 0.2–0.5 mm. Hg is recovered as product. Infrared (IR) and nuclear magnetic resonance (NMR) analyses indicate the product to be essentially pure N-cyclohexylthio tert-butylamine.

Example 2

Dimethylamine (about 30 g.) is bubbled through a solution of 25 g. N-cyclohexylthio phthalimide in 300 ml. of benzene between 0–5° C. A white precipitate forms during the addition of the dimethylamine. The solution is filtered to give 14 grams of a white solid identified as the dimethylamine salt of phthalimide. The filtrate is distilled to remove the benzene and to recover the product, 10.5 g. of N-cyclohexylthio dimethylamine, B.P. 38–40° C. at 0.3 mm. Hg. Analysis of the said product gives 8.90% nitrogen and 20.01% sulfur compared to 8.80% nitrogen and 20.05% sulfur calculated for $C_8H_{17}NS$.

Example 3

Di-n-hexylamine (37.0 g., 0.2 mole) is added to N-cyclohexylthio phthalimide (52.0 g., 0.2 mole) in 400 ml. of heptane at 90° C. and the mixture is stirred for six hours. 29 grams of phthalimide is recovered by filtration. Evaporation of the filtrate yields 58.0 grams of N-cyclohexylthio di-n-hexylamine, a yellow liquid, which is soluble in benzene, chloroform and heptane. Analysis gives 4.75% nitrogen and 10.91% sulfur compared to 4.67% nitrogen and 10.70% sulfur calculated for $C_{18}H_{37}NS$.

Example 4

Piperidine (8.5 g., 0.1 mole) and N-cyclohexylthio phthalimide (26.2 g., 0.1 mole) in 200 ml. of benzene are stirred at 60° C. for four hours. The mixture is stirred while cooling to room temperture overnight. By-product phthalimide (10.9 g., M.P. 234° C.) is recovered by filtration. The product obtained by evaporation of the filtrate is 14.0 grams of N-cyclohexylthio piperidine, B.P. 83–88° C./0.8 mm. Hg. Analysis of the product gives 7.01% nitrogen and 15.51% sulfur compared to 7.05% nitrogen and 16.09% sulfur calculated for $C_{11}H_{21}NS$.

Examples 5–12

The procedure of Example 4 is followed to produce the thioamines shown in Table I. 0.2 gram mole of N-cyclohexylthio phthalimide is reacted with 0.2 gram mole of the appropriate amine at the indicated reaction temperature, $R_x$.

Example 15

4,4'-trimethylene dipiperidine (10.5 g., 0.05 mole) in 150 ml. of isopropanol is added to 26 grams (0.1 mole) of N-cyclohexylthio phthalimide in 200 ml. of isopropanol at 55–60° C. The mixture is stirred for eight hours at 55° C. and then cooled to about room temperature. Eleven grams of a white solid identified as phthalimide is obtained by filtration. The filtrate is evaporated and the residue taken up in ether. An additional 3.2 grams of phthalimide is recovered by filtration. The ethereal solution is evaporated and the residue is recrystallized from methanol to give 19.3 grams of N,N'-di(cyclohexylthio)-4,4'-trimethylene dipiperidine, a white solid melting at 38° C. Analysis gives 68.81% carbon, 10.57% hydrogen, 6.25% nitrogen and 14.28% sulfur compared to 68.43% carbon, 10.56% hydrogen, 6.38% nitrogen and 14.61% sulfur calculated for $C_{25}H_{46}N_2S_2$.

Examples 16 and 17

Piperidine (8.5 g., 0.1 mole) and N-cyclooctylthio phthalimide (28.9 g., 0.1 mole) in 250 ml. of heptane are stirred for six hours at 90° C. The mixture is cooled and 14.5 grams of phthalimide is recovered by filtration. The filtrate is evaporated to remove the heptane. The residue, 22 grams of a yellow liquid, is distilled at 117° C. at 1 mm. Hg to give N-cyclooctylthio piperidine. Analysis gives 68.63% carbon, 11.07% hydrogen, 6.20% nitrogen and 14.09% sulfur compared to 68.52% carbon, 11.17% hydrogen, 6.08% nitrogen and 14.09% sulfur calculated for $C_{13}H_{25}NS$.

A similar procedure with the exception that N-cyclododecylthio phthalamide is used, gives N-cyclododecylthio piperidine.

Example 18

A solution of N-cyclooctylthio phthalimide (57.9 g., 0.2 mole) and azabicyclo[3.2.2]nonane (31.3 g., 0.25

TABLE I

| Product | $R_x$ temp., °C. | Yield, grams | Analysis | | | | B.P., °C./ mm. Hg |
|---|---|---|---|---|---|---|---|
| | | | Nitrogen | | Sulfur | | |
| | | | Found | Calc. | Found | Calc. | |
| N-cyclohexylthio 4-methylpiperidine | 80–90 | 38.0 | 7.03 | 6.56 | 15.80 | 15.06 | 86–92/0.5 |
| N-cyclohexylthio morpholine | 60 | 26.0 | 6.62 | 6.95 | 15.33 | 15.93 | |
| N-cyclohexylthio-2,6-dimethylmorpholine | 90 | 39.5 | 5.77 | 6.10 | 14.76 | 13.97 | |
| N-cyclohexylthio pyrrolidine | 90 | 34.5 | 7.52 | 7.55 | 17.28 | 17.30 | 70–74.5/0.5 |
| N-cyclohexylthio-2,5-dimethylpyrrolidine | 90 | 38.5 | 5.96 | 6.56 | 14.95 | 15.02 | |
| N-cyclohexylthio hexamethylenimine | 90 | | 6.33 | 6.56 | 15.45 | 15.02 | |
| N-cyclohexylthio azabicyclo[3.2.2]nonane | 84 | 43.0 | 5.85 | 5.85 | 13.18 | 13.39 | |
| N-cyclohexylthio-4-phenylpiperidine [1] | 90 | [2] 26.0 | | | | | |

[1] Product identified by NMR analysis.
[2] 0.1 mole of reactant used.

Examples 13 and 14

This and the next example illustrate the preparation of a bis-thioamine. Piperazine (8.6 g., 0.1 mole) dissolved in 75 ml. of isopropanol is added to a solution of N-cyclohexylthio phthalimide in 250 ml. of isopropanol at 55° C. The mixture is stirred for six hours at 55° C., then filtered to remove 29.5 grams of phthalimide. The filtrate is evaporated; the residue dissolved in heptane and filtered to remove residual impurities. The heptane is removed from the filtrate and 9.5 grams of N,N'-di(cyclohexylthio) piperazine is recover. Recrystallized from methanol, the product melts at 74–75° C. Analysis gives 61.08% carbon, 9.52% hydrogen, 20.32% sulfur and 8.93% nitrogen compared to 61.09% carbon, 9.61% hydrogen, 20.38% sulfur and 8.90% nitrogen calculated for $C_{16}H_{30}N_2S_2$.

The same procedure with the exception homopiperazine is used, gives 1,4-bis(cyclohexylthio)homopiperazine which melts at 42° C. Analysis gives 62.33% carbon, 9.85% hydrogen, 8.52% nitrogen and 19.37% sulfur compared to 62.39% carbon, 9.82% hydrogen, 8.53% nitrogen and 19.51% sulfur calculated for $C_{17}H_{32}N_2S_2$.

mole) in 300 ml. of isopropyl alcohol are stirred at 82–83° C. for five hours. The mixture is allowed to cool to 30° C., then 400 ml. of water containing 40 grams of 25% NaOH is added. 600 ml. of ethyl ether is added and the mixture stirred for 30 minutes at 25–30° C. The ether layer is separated, washed with water until neutral and dried over $Na_2SO_4$. The ether is removed in vacuo at 80–90° C. at 1–2 mm. Hg. 52 grams (97% yield) of N-cyclooctylthio azabicyclo[3.2.2]nonane, amber viscous liquid, is recovered. Analysis gives 71.24% carbon, 10.76% hydrogen, 4.85% nitrogen and 11.87% sulfur compared to 71.84% carbon, 10.93% hydrogen, 5.24% nitrogen and 11.99% sulfur calculated for $C_{16}H_{29}NS$.

Examples 19 and 20

N-(isobutylthio)phthalimide (2.35 g., 0.01 mole) and morpholine (0.87 g., 0.01 mole) in 75 ml. of heptane are stirred at 80° C. for 3½ hours. The mixture is cooled to room temperature overnight and filtered to remove phthalimide (1.45 g.). The filtrate is vacuum stripped to give N-(isobutylthio)morpholine. The identification is confirmed by NMR analysis.

The procedure is repeated using N-(phenylthio)phthalimide in place of N-(isobutylthio)phthalimide. N-(phenylthio)morpholine, M.P. 31.5–33° C., is recovered (1.27 g., 65% yield).

Example 21

N-(3-methylphenylthio)succinimide (1.50 g., 0.068 mole) and morpholine (0.59 g., 0.068 mole) in 75 ml. of heptane are stirred at 80° C. for 3½ hours, then cooled to room temperature overnight. 0.63 grams of succinimide is recovered by filtration. The filtrate is vacuum stripped; and N-(3-methylphenylthio)morpholine is recovered. Analysis gives 63.53% carbon, 7.37% hydrogen, 6.54% nitrogen and 15.56% sulfur compared to 63.12% carbon, 7.22% hydrogen, 6.69% nitrogen and 15.32% sulfur calculated for $C_{11}H_{15}NOS$.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for the preparation of thioamine which comprises reacting an amine of the formula

with a compound of the formula

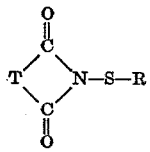

and isolating

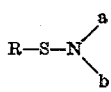

in which (a) is hydrogen, and (a) and (b) independently are alkyl, aralkyl, cycloalkyl, or (a) and (b) taken together with the delineated nitrogen atom is a heterocyclic radical in which (a) and (b) are alkylene, mono-, di-, or trimethyl alkylene, phenylalkylene, or alkylene or dimethylalkylene interrupted by a radical selected from the group consisting of —O—, —S—, and —NH—, or

is azabicyclo (3.2.2)non-3-yl, with the proviso that when (a) is hydrogen (b) is tertiary alkyl, and

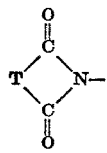

is selected from the group consisting of succinimidyl, glutarimidyl, adipimidyl, phthalimidyl, maleimidyl and hydrophthalimidyl; and R is alkyl, aralkyl, aryl, alkaryl or cycloalkyl.

2. A process according to claim 1 wherein (a) and (b) are lower alkyl.
3. A process according to claim 1 wherein

is a heterocyclic radical.
4. A process according to claim 1 wherein

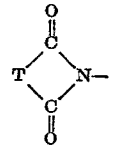

is succinimidyl.
5. A process according to claim 1 wherein

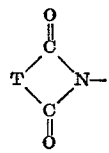

is phthalimidyl.
6. A process according to claim 5 wherein (a) and (b) are lower alkyl.
7. A process according to claim 5 wherein

is a heterocyclic radical.
8. A process according to claim 4 wherein R is aryl.
9. A process according to claim 4 wherein R is cycloalkyl.
10. A process according to claim 5 wherein R is aryl.
11. A process according to claim 5 wherein R is cycloalkyl.
12. A process according to claim 6 wherein (a) and (b) are methyl.
13. A process according to claim 7 wherein the heterocyclic radical is morpholino.
14. A process according to claim 1 wherein N-cyclohexylthio tert-butylamine is prepared by reacting N-cyclohexylthio phthalimide with tert-butylamine.
15. A process of claim 5 wherein the reaction is conducted in an inert organic solvent.
16. A process of claim 11 wherein the reaction is conducted in an inert organic solvent.

References Cited

UNITED STATES PATENTS

| | | | |
|---|---|---|---|
| 2,382,793 | 8/1945 | Howland | 260—306.6 |
| 3,595,871 | 7/1971 | Campbell et al. | 260—306.6 |

FOREIGN PATENTS 551,681   3/1943   England.

HARRY I. MOATZ, Primary Examiner

U.S. Cl. X.R.

260—239 R, 239 B, 239 BA, 239 BF, 268 S, 293.4, 293.69, 293.85, 326.9, 326 S, 551 S

UNITED STATES PATENT OFFICE
CERTIFICATE OF CORRECTION

Patent No. 3,790,568          Dated February 5, 1974

Inventor(s) Joseph Edward Kerwood and Robert I. Leib

It is certified that error appears in the above-identified patent and that said Letters Patent are hereby corrected as shown below:

Col. 1, line 34 "reacation" should read --reaction--.

Col. 2, line 15 "acylic" should read --acyclic--

Col. 3, line 25 "genreal" should read --general--.
       line 50, insert --cyclohexylene-- before "cyclooctylene".

Add Claim 17 as follows:

17. A process of Claim 1 wherein the reaction is conducted in an enert organic solvent.

On the Cover Sheet, "16 Claims" should read
-- 17 Claims --.

Signed and sealed this 1st day of April 1975.

(SEAL)
Attest:

RUTH C. MASON
Attesting Officer

C. MARSHALL DANN
Commissioner of Patents
and Trademarks